(No Model.)
U. M. GORDON.
BRAKE BLOCK.
No. 268,092. Patented Nov. 28, 1882.
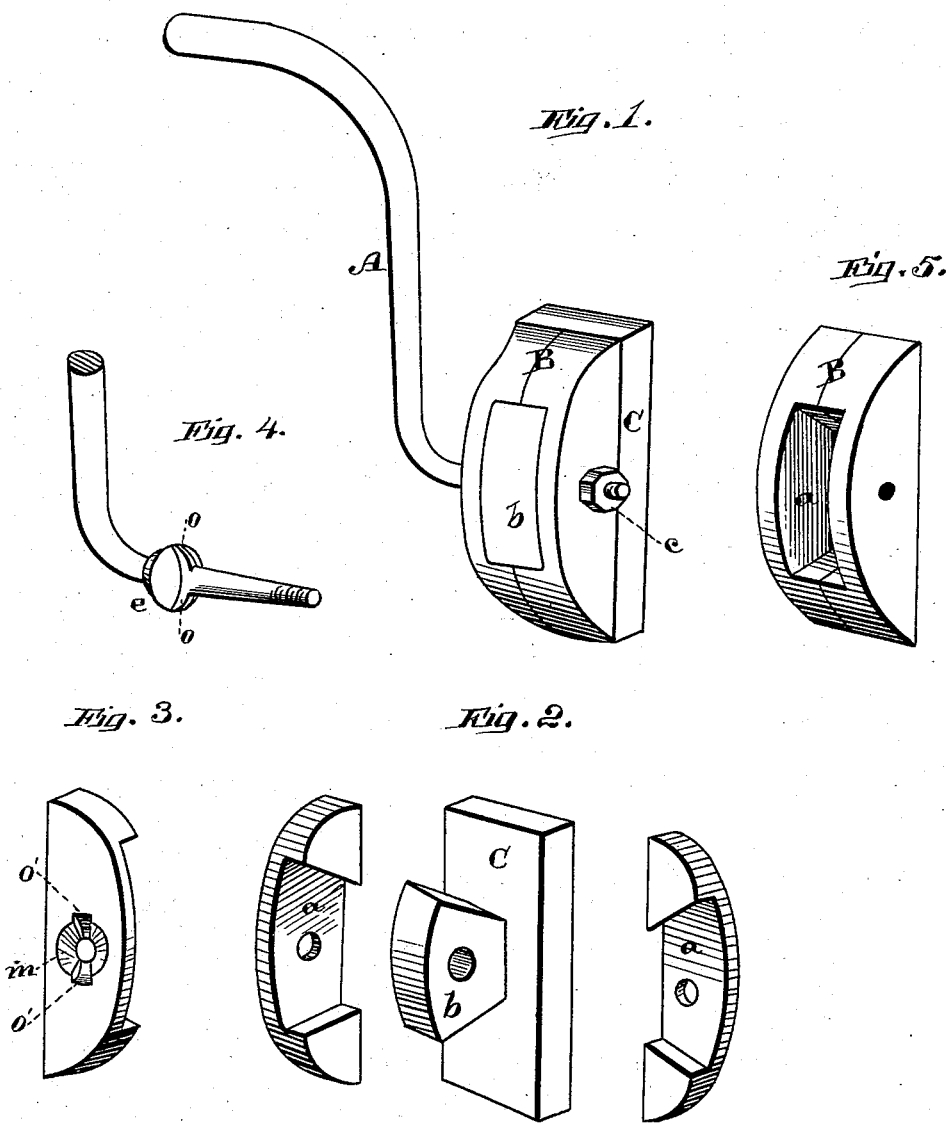
Witnesses,
Geo. H. Strong
J. H. Krouse
Inventor,
Upton M. Gordon
By Duwig & Co.
Attorneys

UNITED STATES PATENT OFFICE.

UPTON M. GORDON, OF SAN RAFAEL, CALIFORNIA.

BRAKE-BLOCK.

SPECIFICATION forming part of Letters Patent No. 268,092, dated November 23, 1882.

Application filed September 18, 1882. (No model.)

*To all whom it may concern:*

Be it known that I, UPTON M. GORDON, of San Rafael, county of Marin, State of California, have invented an Improved Brake-Block; and I hereby declare the following to be a full, clear, and exact description thereof.

My invention relates to certain new and useful improvements in brake-blocks; and it consists in the novel construction of the body of the block and of the rubber or shoe thereof, whereby the latter may be readily inserted or removed, when worn, for the substitution of another; and, further, in the means of securing the block to the bar or shaft which supports it, whereby it may adjust itself squarely against the wheel, whether it be raised or lowered, by reason of the weight in the wagon, all of which will hereinafter fully appear.

The object of my invention is twofold. In the first place it is customary to form the rubbing-surface of the brake-block of some hard wood. This is found to be the most desirable of all substances; but it soon wears, and then leather is secured to the wood to keep the thickness of the block. This is done as a temporary expedient and because of the great difficulty in fitting a new piece of wood to the present style of socket. My construction remedies this difficulty by making it an easy matter to release the old wooden rubber and insert and secure a fresh one. In the second place it is found, especially in the case of spring-wagons, that when the body is heavily loaded the brakes are depressed beyond the point where they usually impinge upon the wheel, and, being generally rigid upon their bar, they cannot adapt themselves to this changed position, and do not therefore fit their faces squarely against the wheel. I overcome this by the means I show connecting the block with its bar.

Referring to the accompanying drawings, Figure 1 is a view showing brake-block and rubber together on the bar. Fig. 2 is a view showing the two parts of the block separated and the rubber C. Fig. 3 shows the inner part of the block B. Fig. 4 shows the journal and collar of the bar. Fig. 5 shows the socket formed when the two parts of the block are together.

Let A represent that portion of the brake bar or shaft which bends downwardly by the side of the wagon and then horizontally, receiving on its end the brake-block in position to be forced against the wheel. In this case the brake-block (marked B) consists of two pieces of metal having a slightly-concaved face, and each being notched out upon its inner side, to form when brought together a socket, $a$, tapering on all sides from the back to the face of the block.

C represents the wooden rubber, having a tongue or shank, $b$, tapered to fit the socket $a$. To insert the rubber in the block the two sides are separated, and the tongue of the rubber is fitted in the tapering notches of the two parts, thus securing it in the socket $a$, when the end of bar A is passed through both sides of the block and the intervening tongue of the rubber and tightened by a nut, $c$. To remove it I have only to unscrew the nut $c$, take off the outer side of the block, and then the rubber. Another may be readily substituted and secured by replacing the outer side of the block and tightening up the nut $c$. With such a block as this there is no excuse for retaining a worn-out rubber; but a fresh one may at once be inserted.

Near the end of the bar A is a collar, $e$, which in ordinary cases serves the purpose of securing the inner side of the block; but in this case it serves another function by reason of its peculiar construction. Its face is made conical, and has at opposite sides two tenons, $o$. In the side of the inner half of the block the hole through which the journal of the bar passes is beveled out to form a socket, $m$, and has oppositely-placed grooves or notches $o'$. These notches are wider than the tenons $o$. The journal of the bar A passes loosely through the block, so that it may turn thereon; but the collar $e$ is countersunk in the socket $m$, and fits its tenons $o$ in the notches $o'$, thereby limiting the play of the block on the bar to whatever motion it may have by reason of the notches $o'$ being wider than the tenons $o$. When the brakes are depressed, and as a consequence the top of the block strikes the wheel first, it yields sufficiently to adjust the whole face against the wheel, and thus prevent undue wear of any portion. The play required is very small, and the difference between the width of the notches and the tenons fully provides for this, while at the same time too much play is avoided.

Having thus described my invention, what I claim as new, and desire to secure by Letters Patent, is—

1. A two-part brake-block, B, each part of which is so notched or grooved as to form, when brought together, a socket, $a$, tapering on all sides from the back to the front, a rubber, C, having a correspondingly-tapered tongue or shank, $b$, fitting in said socket, and a means for holding the parts of the block together to secure the rubber, all arranged and combined substantially as herein described.

2. A two-part brake-block, B, having a socket, $a$, tapering on all sides from the back to the front, and the rubber C, having a correspondingly-tapered tongue or shank, $b$, fitting in said socket, in combination with the brake bar or shaft A, the journal of which passes through the block and tongue of the rubber, which are secured thereon, substantially as herein described.

3. The brake bar or shaft A and brake-block B, loosely fitted thereon and secured by a nut, in combination with the means for limiting the movement of the block on its journal, consisting of the socket $m$ in the side of the block, having notches or grooves $o'$, and the collar $e$ on the bar, fitting in said socket $m$, and having tenons $o$ narrower than the notches or grooves $o'$, into which they fit, all operating substantially as herein described.

In witness whereof I hereunto set my hand.

UPTON M. GORDON.

Witnesses:
E. W. SKELTON,
J. H. BLOOD.